United States Patent [19]

Rawlings

[11] Patent Number: 4,753,285
[45] Date of Patent: Jun. 28, 1988

[54] PARALLEL PIPING INSTALLATION WITH AIR BY-PASS APPARATUS

[75] Inventor: John P. Rawlings, Hewitt, Tex.

[73] Assignee: Command-Aire Corporation, McGregor, Tex.

[21] Appl. No.: 34,997

[22] Filed: Apr. 6, 1987

[51] Int. Cl.$^4$ ............................ F24J 3/08; F28B 27/02
[52] U.S. Cl. .................................. 165/45; 165/104.32; 165/917; 62/260
[58] Field of Search ...................... 165/45, 104.32, 917, 165/142, 111; 62/260

[56] References Cited

U.S. PATENT DOCUMENTS

| | | | |
|---|---|---|---|
| 3,660,987 | 5/1972 | Gail et al. ............................. | 165/45 |
| 4,538,673 | 9/1985 | Partin et al. ........................... | 62/260 |
| 4,574,875 | 3/1986 | Rawlings et al. ..................... | 165/142 |

FOREIGN PATENT DOCUMENTS

| | | | |
|---|---|---|---|
| 3514191 | 10/1986 | Fed. Rep. of Germany ........ | 62/260 |
| 2307212 | 11/1976 | France ................................. | 165/917 |

Primary Examiner—Albert W. Davis, Jr.
Attorney, Agent, or Firm—Arthur F. Zobal

[57] ABSTRACT

A piping installation having a supply header, a return header, and a branch conduit array with parallel branch conduits is provided with a by-pass apparatus to by-pass any trapped air within the piping installation away from the branch conduit array. The by-pass apparatus is connected to the supply header at a position immediate to the supply header end of the downstream-most branch conduit, and to the return header. The by-pass apparatus has a by-pass conduit and an adapter. The by-pass conduit has a length and an inside diameter that presents substantially more resistance to the flow of fluid than to the flow of air. In addition, the length of the by-pass conduit allows the supply header to be properly spaced from the return header so as to minimize thermal interference. An adapter is provided on each end of the by-pass conduit and facilitates the connection of the by-pass conduit to the respective header.

7 Claims, 3 Drawing Sheets

PARALLEL PIPING INSTALLATION WITH AIR BY-PASS APPARATUS

FIELD OF THE INVENTION

The present invention relates to piping installations having a parallel array such as might be used in conjunction with closed loop earth coupled heat transfer systems.

BACKGROUND OF THE INVENTION

Water source heat pumps are used to provide temperature regulation for interior spaces. A water source heat pump makes use of the ground as a heat reservoir by either storing heat removed from interior spaces in the ground or removing heat from the ground and applying it to the interior spaces. Such a heat pump is referred to as an earth coupled heat pump. An earth coupled heat pump accesses the ground-based heat reservoir through a piping installation which is buried in the ground and through which liquid fluid, such as water or a water and an antifreeze solution, circulates.

The piping installation of an earth coupled heat pump may be configured in either a series arrangement, where all of the fluid travels through the same pipe, or a parallel arrangement, where the fluid travels through different branches in the pipe. A parallel piping installation includes a supply header, a return header, and a plurality of parallel branches connected between the two headers.

Any piping installation is susceptible to fluid circulation problems caused by air trapped within the pipes. Air is typically trapped within the various pipes during the installation process. However, in a series arrangement, any trapped air can be removed by thorough purging of the piping system. Trapped air presents a more serious problem in a parallel piping installation where purging may not be able to remove all of the air. Inadequate air removal is common because the air follows the path of least resistance and eventually congregates in one branch, typically the last branch. Because of the head loss that it would take to move the air bubble out of the affected branch, the fluid in the piping installation follows the path of least resistance and splits its flow between the remaining branches. This flow pattern results in a loss of use of the affected branch and reduces the overall system efficiency accordingly.

In the prior art, as disclosed by U.S. Pat. No. 4,538,673, the trapped air is passed from the supply header to the return header through fittings which nominally by-pass each parallel branch. Each fitting has a small orifice for letting air pass directly from the supply header to the return header. This type of arrangement requires close physical proximity between the supply and return headers resulting in thermal interference between the headers and some loss of system efficiency. In addition, the headers may undergo unnecessary stress due to incorrect pipe alignment or pipe memory mismatch.

SUMMARY OF THE INVENTION

It is an object of the present invention to provide an apparatus that prevents the trapping of air in a parallel piping installation.

The piping installation of the present invention comprises a supply header, a return header, a branch conduit array, and by-pass conduit means. The supply header carries a fluid medium to the branch conduit array and the return header carries the fluid medium away from the branch conduit array. The branch conduit array has a plurality of branch conduits. Each branch conduit has two ends with one end being connected to the supply header and with the other end being connected to the return header. The branch conduits are connected across the supply and return headers so as to be parallel to one another. The branch conduit array has a last branch conduit which is that branch conduit connected to the supply header at a location downstream from the other branch conduits. The by-pass conduit means has two ends with one end being connected to the supply header at a position close to the supply header end of the last branch conduit, and with the other end being connected to the return header. The by-pass conduit means has a length and a transverse cross-sectional area that presents substantially more resistance to the flow of the fluid medium than to the flow of air. The length of the by-pass conduit means is sufficiently large so as to allow proper spacing between the headers thereby minimizing thermal interference.

In another aspect, the by-pass conduit means is connected to the return and supply headers via adapter means.

In still another aspect, the adapter means is of sufficient length so that if the adapter means is incorrectly connected to a header, the adapter means may be severed and reconnected.

DESCRIPTION OF THE PREFERRED EMBODIMENT

Figure 1:
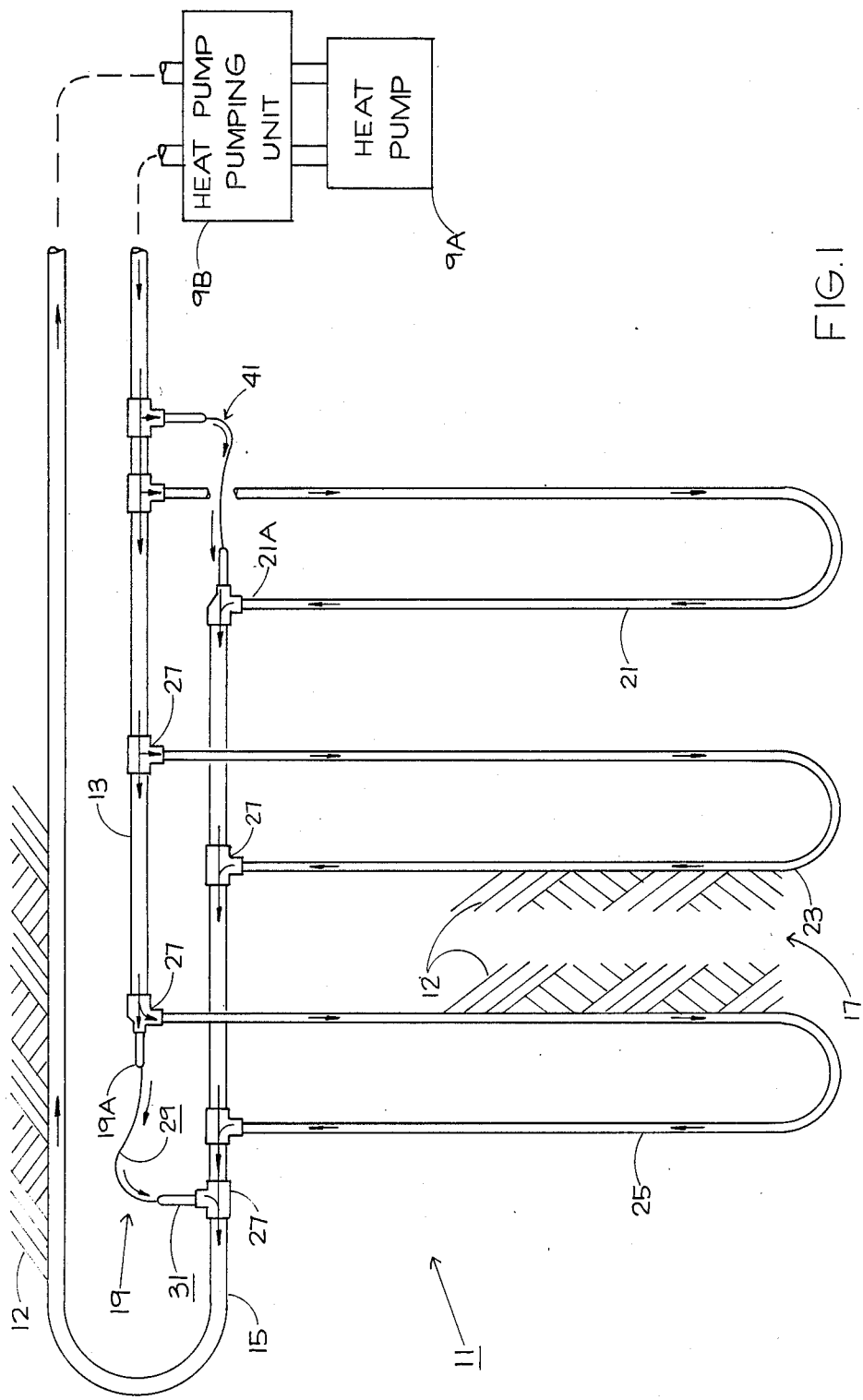
FIG. 1 is a schematic view of the relevant portion of the piping installation, complete with by-pass apparatuses, of the present invention, in accordance with a preferred embodiment, as configured for a parallel earth coupled water source heat pump.

In FIG. 1 there is shown a portion of a piping installation 11 of the present invention as shown in accordance with a preferred embodiment. The piping installation 11 is a component of one of the heat exchange loops in a water source earth coupled heat pump 9A. Liquid fluid, such as water or a water and an antifreeze solution, in the heat exchange loop is circulated through the piping installation 11, which incorporates the actual heat exchange unit, and through valves, an air isolation chamber and other pieces of miscellaneous equipment which are located in the heat pump pumping unit 9B. The heat pump is referred to as an earth coupled heat pump, since most of the piping installation 11, particularly that portion illustrated in FIG. 1, is buried in the earth 12. The piping installation may be buried in either solid ground or a pond or lake. The fluid circulates through the piping installation in a closed loop configuration. Antifreeze may be added to the water in the piping installation where required by low ground temperatures. The piping installation 11 of the present invention includes a supply header 13, a return header 15, a branch conduit array 17, and by-pass apparatuses 19, 41.

The supply header 13 is piping that carries the circulating fluid from the heat pump unit to the branch conduit array 17. (In FIG. 1, the arrows inside of the pipes indicate the direction of water flow.) The return header 15 is piping which is similar to the supply header 13 except that it carries the circulating fluid away from the branch conduit array 17. It is in the array 17 where most of the exchange of heat between the circulating fluid and the ground occurs. The array 17 is made up of a plurality of branch conduits 21, 23, 25, each of which is of smaller inside diameter than the headers 13, 15. Each branch conduit has two ends, one end of which is connected to the supply header 13, with the other end connected to the return header 15. The ends of the branch conduit are connected to the respective headers via fittings 27. The branch conduits 21, 23, 25 are connected to the supply and return headers such that the individual branch conduits are in parallel to one another. In the branch conduit array 17 is a last branch conduit 25. The last branch conduit 25 is that branch conduit which is connected to the supply header 13 at a location downstream from the other branch conduits 21, 23.

Figure 2:
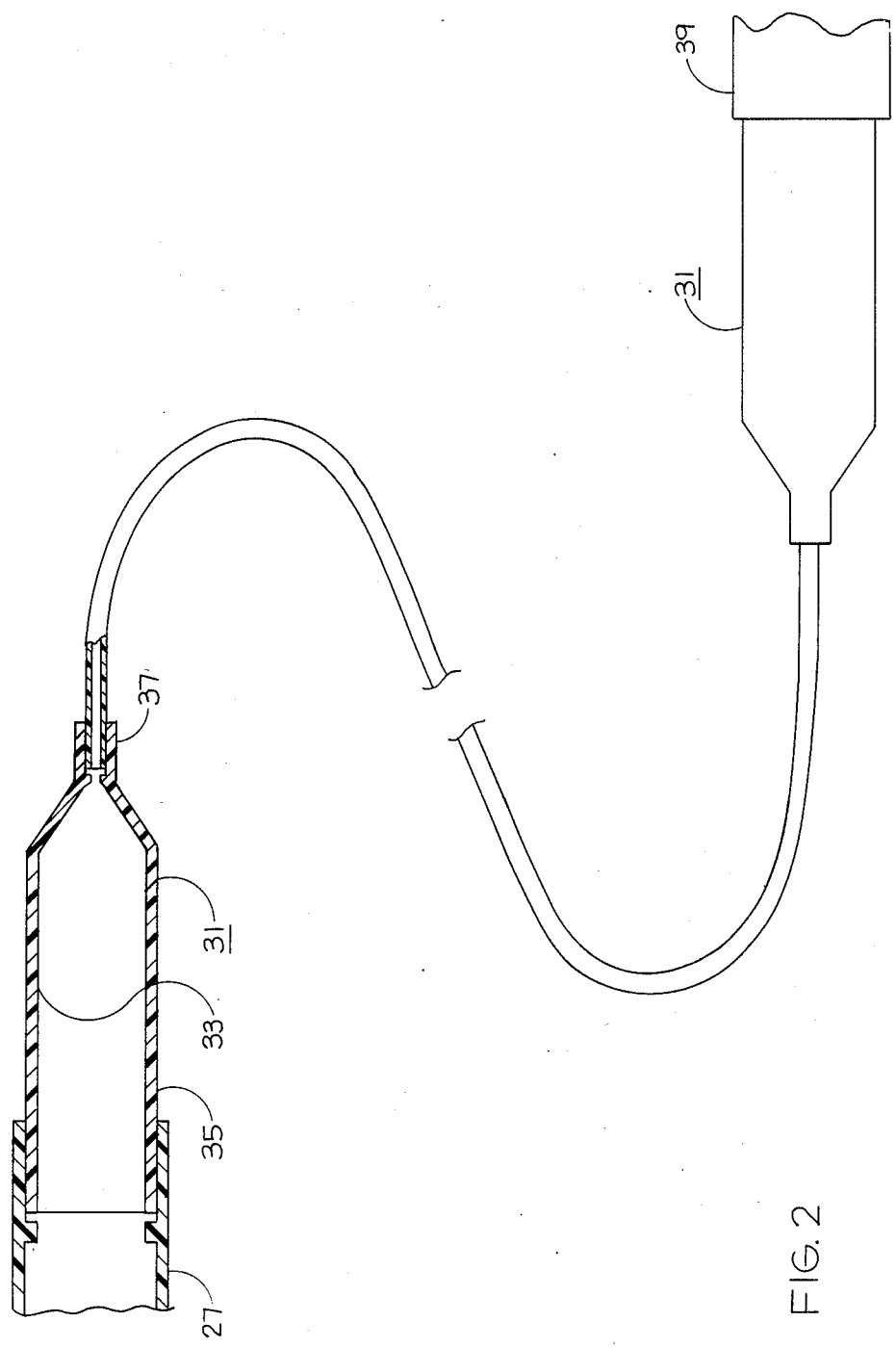
FIG. 2 is a schematic partial cross-sectional view of one of the by-pass apparatuses of FIG. 1.

The by-pass apparatus 19 includes a by-pass conduit 29 and a pair of adapters 31 (see FIG. 2). The by-pass conduit 29 is a pipe having over its entire length a small inside diameter relative to the inside diameters of the headers and the branch conduits. The adapter 31 is generally cylindrical with a generally cylindrical cavity 33 therein. The cavity 33 has a varying diameter ranging from the inside diameter of the respective fitting 27 at one end 35 to the inside diameter of the by-pass conduit 29 at the other end 37. The large end 35 of the adapter is matingly received by a fitting 27 on one of the headers while the small end 37 of the adapter matingly receives one end of the by-pass conduit 29. The by-pass conduit 29 has an adapter on both of its ends. (See FIG. 1.) One end of the by-pass apparatus 19 is connected to the supply header 13, via a fitting 27. The end 19A of the by-pass apparatus 19 should be connected to the supply header 13 at a point immediate to the point of connection of the last branch conduit 25 with the supply header to eliminate the formation of air blockages that could otherwise occur if the distance between the by-pass apparatus-supply header connection point and the last branch conduit-supply header connection point became too great. The other end of the by-pass apparatus 19 is connected, via a fitting 27, to the return header 15. In the preferred embodiment, the other end of the by-pass apparatus is connected to the return header at a position downstream from where the last branch conduit is connected to the return header.

Air is typically trapped within the piping installation during the installation process. In a parallel piping installation without a by-pass apparatus 19, any air trapped inside tends to congregate in the last branch conduit 25 as a bubble. Because of the head loss that is required to move such an air bubble out of the last branch conduit, the fluid in the piping installation splits its flow between the two remaining branch conduits 21, 23. Thus, no fluid at all flows through the last branch conduit.

However, a parallel piping installation with a by-pass apparatus 19 does not permit the formation of an air bubble capable of blocking fluid flow through a branch conduit. The inside diameter and the length of the by-pass conduit 29 are such that the by-pass conduit presents substantially more resistance to the flow of the circulating fluid than to the flow of any air trapped within the piping installation 11. This results in a substantial portion of the fluid, which is within the supply header 13 at a point slightly upstream from the last branch conduit, entering the last branch conduit 25 while air by-passes the branch conduit array 17 and enters the by-pass conduit 29. Such a result is made possible by the difference in viscosities between air and fluid. The air is removed from the closed loop piping installation by valving or air traps located in the heat pump pumping unit 9B. By shunting any trapped air directly from the supply header to the return header, the problems associated with air bubbles in one of the parallel branch conduits is eliminated. Balanced against the need to by-pass air is the desire to optimize the efficiency of the overall heat pump system. If the by-pass conduit is too short or if the inside diameter is too large, too much fluid by-passes the branch conduit array with a resulting loss of heat exchange. If the by-pass conduit is too long or if the inside diameter is too small, too much air enters the branch conduit array.

In the preferred embodiment, the piping installation is provided with two by-pass apparatuses 19, 41. The by-pass apparatuses 19, 41 differ from one another only in their respective locations relative to the branch conduit connections to the headers. One by-pass apparatus 19 is located at the end-most portion of the supply header 13 while the other by-pass apparatus 41 is located at the end-most portion of the return header 15. Thus, with the direction of fluid flow as shown in FIG. 1, one by-pass apparatus 19 is connected to the downstream end of the supply header 13, and the other by-pass apparatus 41 is connected to the upstream end of the return header 15. The by-pass apparatus 41 is connected to the return header 15 at a position immediate to the return header end 21A of the first branch conduit 21. With the two by-pass apparatuses, the direction of fluid flow through the piping installation becomes irrelevant since there is a by-pass apparatus located at the downstream end of whichever header is chosen to be the supply header. This arrangement has practical consequences in that it allows the installer to choose the supply header after the installation of pipe in the ground has been completed.

Figure 3:
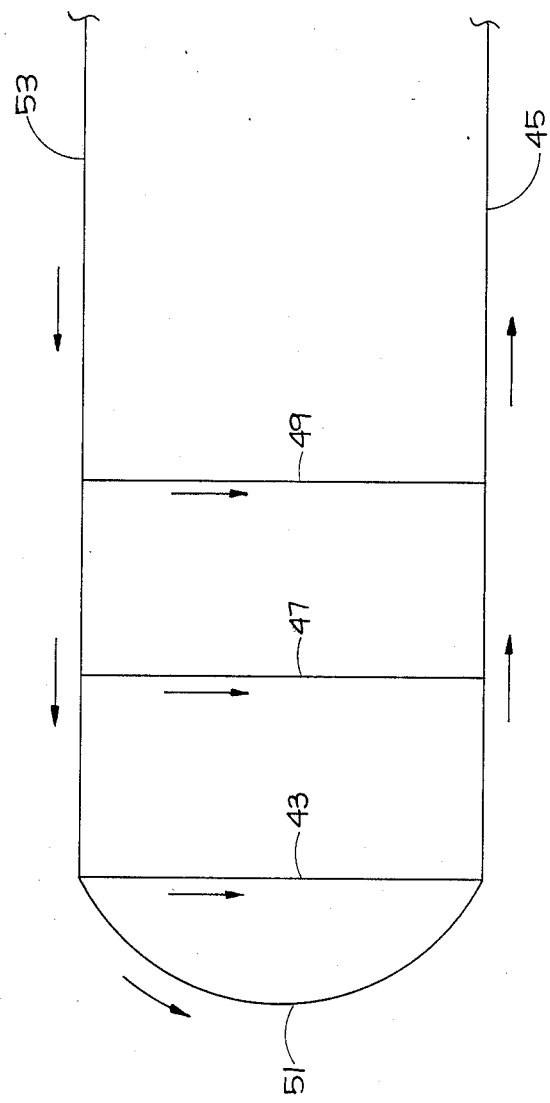
FIG. 3 is a schematic view of the relevant portion of a direct return configuration piping installation.

The by-pass apparatuses 19, 41 can be utilized in piping installations where the branch conduits are connected to the headers in a reverse return configuration (see FIG. 1) or in a direct return configuration (see FIG. 3). A direct return configuration is similar to a reverse return configuration, with the exception of the connections of the branch conduits to the return header. In a reverse return configuration, the last branch conduit is connected to the return header at a position downstream from the other branch conduits. However, in a direct return configuration, the last branch conduit 43 is connected to the return header 45 at a position upstream from the other branch conduits 47, 49. The by-pass apparatus 51 is connected to the supply header 53 at a position close to where the last branch conduit 43 is connected to the supply header, and to the return header at a position close to where the last branch conduit is connected to the return header. In addition, the by-pass apparatuses can be utilized in piping installations where the branch conduits are positioned in the ground in either horizontal or vertical orientations.

An aspect of the adapter configuration allows for the simple correction of an improper installation of an adapter. Should an adapter be incorrectly installed into a fitting, such that a watertight seal between the adapter and the fitting is not formed, the adapter can be cut off from the fitting at a point close to that fitting and reinstalled into a new fitting. This versatility arises from the excess length that is provided in the adapter. The adapter length can be shortened without interfering in the by-pass characteristics of the by-pass conduit.

Typical dimensions and specifications regarding the piping installation of the present invention may be stated as follows: The supply and return headers are each 100-200 feet in length with an inside diameter of 1.5-2 inches or more. The piping installation has anywhere from two branch conduits on up to ten branch conduits or more. The branch conduits are each 100-600 feet or more in length with an inside diameter of approximately 1 inch. The headers, the branch conduits, the by-pass conduit, and the adapters are made of polybutylene. The by-pass conduit is 10 feet in length with an inside diameter of approximately ⅛ inch. Typical flow rates for a heat exchange loop having a total flow of 9 gallons per minute (GPM) are as follows: Through each branch conduit is a flow of 2.94 GPM. Each of the two by-pass conduits has a flow of 0.09 GPM.

It will be understood by those skilled in the art that the foregoing dimensions and specifications are by way of illustrative example only and may be changed in various ways without departing from the principles of the invention.

The piping installation of the present invention is not subject to the disadvantages of the prior art piping installations herein before discussed. The by-pass apparatus shunts a large quantity of air but only a very small amount of fluid. In addition, the by-pass apparatus allows the supply and return headers to be spaced sufficiently far apart to minimize thermal interference. Also, the by-pass apparatus introduces no new stresses on the headers.

What is claimed:

1. A piping installation placed in the earth for use with a heat pump which utilizes a liquid fluid medium for heat transfer, comprising:
   a supply header for carrying said fluid medium to a branch conduit array,
   a return header for carrying said fluid medium away from said branch conduit array,
   said branch conduit array having a plurality of individual branch conduits, wherein each branch conduit has two ends with one of said ends being connected to said supply header and with the other of said ends being connected to said return header such that said branch conduits are connected in parallel to each other across said supply and return headers,
   said branch conduit array having a last branch conduit, said last branch conduit being that branch conduit which is connected to the supply header at a location downstream from the other branch conduits,
   by-pass conduit means having two ends with one of said two ends being connected to said supply header at a position close to the supply header end of the last branch conduit, the other of said two ends being connected to the return header, wherein said by-pass conduit means allows a portion of said fluid medium to flow directly from the supply header to the return header and by-pass the branch conduit array,
   said by-pass conduit means having a length and an inside transverse cross-sectional area so as to present substantially more resistance to the flow of said fluid medium than to the flow of air trapped within said piping installation, wherein a substantial portion of the fluid medium in the supply header at the last branch conduit enters the last branch conduit with the remaining portion of the fluid medium entering the by-pass conduit,
   said length of said by-pass conduit means being sufficiently large so as to allow proper spacing between said supply and return headers, wherein thermal interference between said supply and return headers may be reduced.

2. The piping installation of claim 1, wherein said by-pass conduit means has over substantially its entire length an inside transverse cross-sectional area which is less than the inside transverse cross-sectional area of each of the supply header, the return header, and the branch conduits.

3. The piping installation of claim 1, wherein said by-pass conduit means is the only conduit wherein said fluid medium can flow directly from the supply header to the return header and by-pass the branch conduit array.

4. The piping installation of claim 2, wherein said by-pass conduit means is the only conduit wherein said fluid medium can flow directly from the supply header to the return header and by-pass the branch conduit array.

5. The piping installation of claim 1, further comprising:
   said piping installation is of a reverse return configuration,
   said branch conduit array having a first branch conduit, said first branch conduit being that branch conduit which is connected to the supply and return headers at locations upstream from the other branch conduits,
   said by-pass conduit means is a first by-pass conduit means,
   second by-pass conduit means having two ends with one of said two ends of said second by-pass conduit means being connected to said return header at a position close to the return header end of said first branch conduit, the other of said two ends of said second by-pass conduit means being connected to the supply header, wherein said second by-pass conduit means allows a portion of said fluid medium to flow directly from the supply header to the return header and by-pass the branch conduit array,
   said second by-pass conduit means having a length and an inside transverse cross-sectional area so as to present substantially more resistance to the flow of said fluid medium than to the flow of air trapped within said piping installation,
   said length of said second by-pass conduit means being sufficiently large so as to allow proper spacing between said supply and return headers, wherein thermal interference between said supply and return headers may be reduced,
   said second by-pass conduit means allowing said return and supply headers to be supply and return headers respectively.

6. A piping installation placed in the earth for use with a heat pump which utilizes a liquid fluid medium for heat transfer, comprising:
   a supply header for carrying said fluid medium to a branch conduit array, a return header for carrying said fluid medium away from said branch conduit array, said branch conduit array having a plurality of individual branch conduits, wherein each branch conduit has two ends with one of said ends being connected to said supply header and with the other of said ends being connected to said return header such that said branch conduits are connected in parallel to each other across said supply and return headers, said branch conduit array having a last branch conduit, said last branch conduit being that branch conduit which is connected to the supply header at a location downstream from the other branch conduits, by-pass conduit means having two ends and being connected between said supply header and said return header, adapter means for connecting said respective ends of said by-pass conduit means to the respective headers, said by-pass conduit means being connected to said supply header at a position close to the supply header end of the last branch conduit of said array and said by-pass conduit means being connected between said headers such that said by-pass conduit means allows a portion of said fluid medium to flow directly from the supply header to the return header and by-pass the branch conduit array, said by-pass conduit means having a length and an inside transverse cross-sectional area so as to present substantially more resistance to the flow of said fluid medium than to the flow of air trapped within said piping installation, wherein a substantial portion of the fluid medium in the supply header at the last branch conduit enters the last branch conduit with the remaining portion of the fluid medium entering the by-pass conduit means, said length of said by-pass conduit means being sufficiently large so as to allow proper spacing between said supply and return headers, wherein thermal interference between said supply and return headers may be reduced.

7. The piping installation of claim 6, wherein each of said adapter means is of sufficient length so that if said adapter means is not properly connected to its header said adapter means can be severed from said header and the remaining adapter means portion can be connected to the its header.

* * * * *